Patented Apr. 20, 1943

2,316,758

UNITED STATES PATENT OFFICE 2,316,758

LEUCO SULPHURIC ACID ESTERS OF THE ANTHRAQUINONE SERIES

Eduard Besler, Frankfort-on-the-Main, Germany, assignor to General Aniline & Film Corporation, New York, N. Y., a corporation of Delaware No Drawing. Application June 24, 1941, Serial No. 399,531. In Germany July 11, 1940

5 Claims. (Cl. 260—193)

The present invention relates to leuco sulphuric acid esters of the anthraquinone series; more particularly it relates to new compounds of the following general formula:

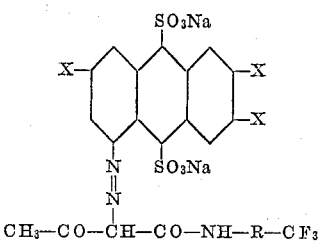

wherein two X's stand for hydrogen, the third X stands for hydrogen or chlorine and R represents a radical of the benzene or naphthalene series.

In German Patent No. 539,115, there is described the leuco sulphuric acid ester of the azo-dyestuff from diazotized alpha-aminoanthraquinone and acetoacetic acid anilide. This leuco sulphuric acid ester dissolves easily in water and yields, when dyed or printed on the fiber according to the method usual for this class of dyestuffs, a yellow shade whose fastness properties do not comply with the requirements of the practice.

Now, I have found that dyestuffs of improved fastness properties are obtained by transforming into the leuco sulphuric acid esters the azo dyestuffs, obtainable from diazotized 1-aminoanthraquinones and acetoacetic acid arylides containing the trifluoromethyl-group in the arylide radical.

In comparison with the dyeings produced with the dyestuff obtainable as disclosed in the example of German Patent No. 539,115 with application of acetoacetic acid anilide, the dyeings produced with the new compounds have, for instance, an essentially better fastness to washing.

The new leuco sulphuric acid esters may be prepared with a very good yield and in a very pure state by treating the compounds, obtainable by coupling diazotized 1-aminoanthraquinones with acetoacetic acid arylides containing the trifluoromethyl group in the arylide radical, in the presence of a tertiary base, for instance, pyridine, with chlorosulphonic acid or another agent yielding sulphuric anhydride, in the presence of a metal, such as copper, iron or the like. The esterification mass is advantageously worked up by introducing it into water and sodium carbonate or caustic soda solution, freed from the pyridine by distillation under reduced pressure, and the metal salts are removed by filtration. From the filtrate the resultant sulphuric acid ester salts are salted out by means of sodium chloride. The precipitated sodium salts of the leuco sulphuric acid esters are filtered with suction and, after stabilization, dried under reduced pressure.

The following examples serve to illustrate the invention, but they are not intended to limit it thereto, the parts being by weight:

(1) 150 parts of chlorosulphonic acid are caused to run, while stirring and cooling, into 800 parts of a pyridine fraction boiling at about 125° C. to about 128° C. Into the mixture thus obtained there are introduced 100 parts of the dyestuff obtainable by coupling diazotized 1-aminoanthraquinone with acetoacetic acid-3-trifluoromethylanilide, and 60 parts of pulverized iron. The reaction mass is heated for a short time to 40° C.–50° C. On account of the reaction heat, the internal temperature rises for a short time to 55° C.–60° C. After stirring for about 1 hour, the mixture is introduced into a solution of 240 parts of sodium carbonate in 4000 parts of water and freed from pyridine by distillation under reduced pressure. Thereupon, the ferruginous mud is removed by filtration and the sulphuric acid ester is salted out from the filtrate by means of sodium chloride. The ester which has precipitated is filtered with suction, washed with a solution of sodium chloride and made into a paste by means of 2% of sodium carbonate. When developed on the fiber with acid oxidizing agents in the usual manner, the leuco sulphuric acid ester yields a greenish yellow of very good properties of fastness. It corresponds with the following formula:

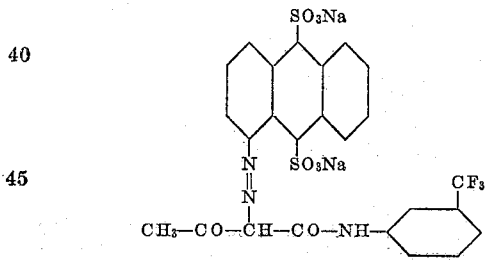

(2) Into an esterification mixture of 800 parts of a pyridine fraction boiling at 125° C.–126° C. and 150 parts of chlorosulphonic acid there are introduced 60 parts of pulverized iron and 100 parts of the dyestuff obtainable by coupling diazotized 1-aminoanthraquinone with acetoacetic acid - 3 - trifluoromethyl - 6 - chloro - anilide.

The reaction mixture is heated to 40° C.–50° C. and, on account of the reaction heat, the temperature rises for a short time to 60° C. When the esterification is finished, the reaction mass is introduced into a solution of 230 parts of sodium carbonate in 4000 parts of water and freed from pyridine by distillation under reduced pressure. The aqueous solution is separated from the ferruginous mud by filtration and the resultant sulphuric acid ester is salted out from the filtrate by means of sodium chloride. The ester which has been salted out is filtered with suction and stabilized by means of sodium carbonate. When treated with oxidizing agents in the presence of acids, the leuco sulphuric acid ester obtained yields in substance as well as on the fiber a vivid, greenish yellow of very good properties of fastness. It corresponds with the following formula:

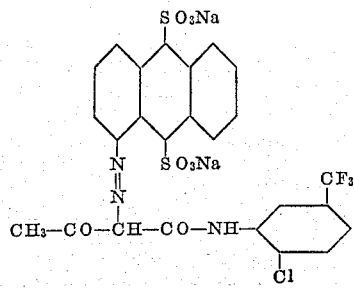

(3) Into an esterification mixture, obtained by dropping at 15° C.–20° C. 150 parts of chlorosulphonic acid into 800 parts of a pyridine fraction boiling at about 125° C. to about 128° C., there is introduced a mixture of 60 parts of pulverized iron and 100 parts of the dyestuff obtainable by coupling diazotized 1-amino-anthraquinone with acetoacetic acid-2-trifluoromethyl-4-chloro-5-methoxy-anilide. The esterification is carried out at 50° C.–60° C. When the reaction is finished, the reaction mass is introduced into a solution of 230 parts of sodium carbonate in 4000 parts of water and the pyridine is distilled off under reduced pressure. Thereupon, the whole is filtered, while hot, and the sulphuric acid ester is salted out from the aqueous filtrate by means of sodium chloride. The ester which has been precipitated, is filtered with suction in the cold and stabilized by addition of sodium carbonate. When treated with acid oxidizing agents, it yields in substance and on the fiber a vivid yellow of very good properties of fastness. It corresponds with the following formula:

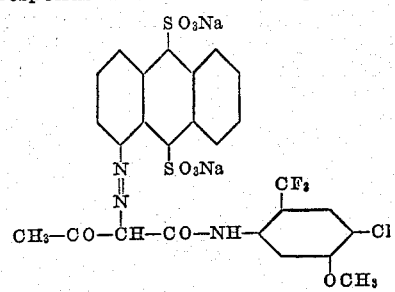

(4) By carrying out the esterification similar to that described in the preceding examples by using an azo-dyestuff prepared by coupling diazotized 1-amino-anthraquinone with acetoacetic acid-2.5-bis-trifluoromethyl anilide, a leuco sulphuric acid ester is obtained which, when developed on the fiber according to the method usual with this class of dyestuffs, yields a greenish yellow of very good properties of fastness. It corresponds with the following formula:

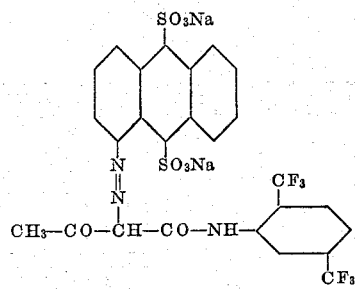

(5) Into an esterification mixture of 800 parts of pyridine boiling at 125° C.–128° C. and 150 parts of chlorosulphonic acid there are introduced 100 parts of the azo-dyestuff, obtainable by coupling diazotized 1-amino-anthraquinone with acetoacetic acid-2-ethylsulphone-5-trifluoromethyl anilide, and 60 parts of pulverized iron. When the esterification, carried through at 50° C.–60° C., is finished, the reaction mixture is introduced into a solution of 230 parts of sodium carbonate in 4000 parts of water and the pyridine is removed by distillation under reduced pressure.

The aqueous solution is freed from the ferruginous mud by filtration and mixed with sodium chloride. At room temperature the ester which has been salted out, is filtered with suction and stabilized by means of sodium carbonate. When printed according to the method usual with this class of dyestuffs, the leuco sulphuric acid ester yields a vivid greenish yellow of very good properties of fastness. It corresponds with the following formula:

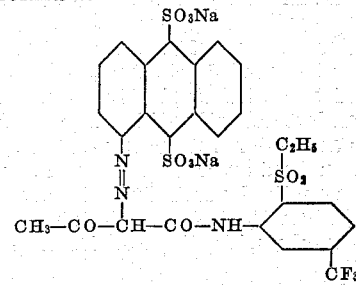

(6) According to the statements in the preceding examples it is also possible to transform into the corresponding leuco sulphuric acid ester the azo-dyestuff obtainable by coupling diazotized 1-amino-3-chloroanthraquinone with acetoacetic acid-3-trifluoromethyl-anilide. When developed in the usual manner with acid oxidizing agents, it yields on the fiber a vivid somewhat reddish yellow of very good properties of fastness. It corresponds with the following formula:

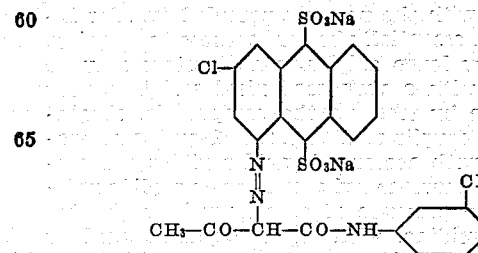

Leuco sulphuric acid esters with properties similar to those described in the preceding examples are obtainable by using dyestuffs which contain as diazo-components instead of 1-aminoanthraquinone or 1-amino-3-chloroanthraquinone other substituted 1-amino-anthraquinones, for instance, 1-amino-6-chloroanthraquinone or 1-amino-7-chloroanthraquinone.

By replacing the azo-dyestuffs used in the preceding examples by the compounds obtained by coupling diazotized 1-amino-anthraquinones with other trifluoromethyl-substituted acetoacetic acid arylides of the benzene series or of those of the naphthalene series, leuco sulphuric acid esters are obtained which are easily soluble in water and yield, when dyed or printed according to the methods usually applied with dyestuffs of this class, yellow to orange tints of good properties of fastness.

I claim:

1. The leuco sulphuric acid esters of the anthraquinone series corresponding with the following formula:

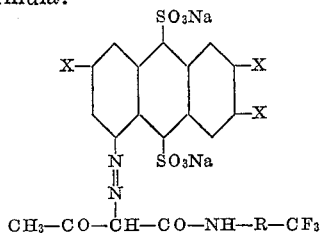

wherein two X's stand for hydrogen, the third X stands for a member of the group consisting of hydrogen and chlorine, and R represents a member of the group consisting of radicals of the benzene and naphthalene series; being easily soluble in water and yielding by acid oxidation in substance and on the fiber yellow to brown shades of good properties of fastness.

2. The leuco sulphuric acid esters of the anthraquinone series corresponding with the following formula:

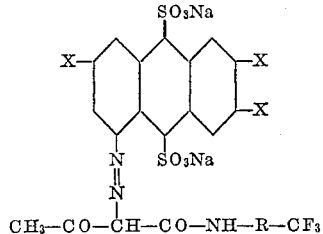

wherein two X's stand for hydrogen, the third X stands for a member of the group consisting of hydrogen and chlorine, and R represents a radical of the benzene series; being easily soluble in water and yielding by acid oxidation in substance and on the fiber yellow to brown shades of good properties of fastness.

3. The leuco sulphuric acid ester of the anthraquinone series corresponding with the formula:

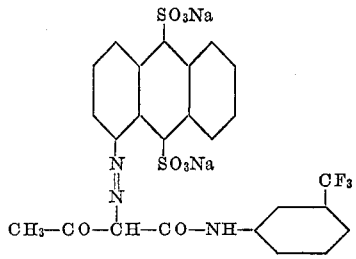

being easily soluble in water and yielding by acid oxidation in substance and on the fiber greenish yellow shades of very good properties of fastness.

4. The leuco sulphuric acid ester of the anthraquinone series corresponding with the formula:

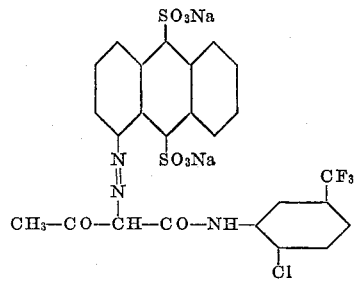

being easily soluble in water and yielding by acid oxidation in substance and on the fiber vivid greenish yellow shades of very good properties of fastness.

5. The leuco sulphuric acid ester of the anthraquinone series corresponding with the formula:

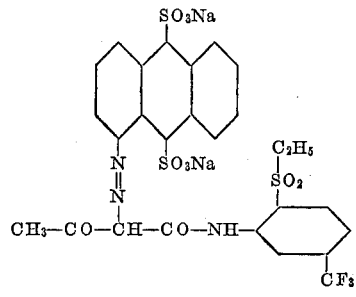

being easily soluble in water and yielding by acid oxidation in substance and on the fiber vivid greenish yellow shades of very good properties of fastness.

EDUARD BESLER.